(12) United States Patent
Basile et al.

(10) Patent No.: US 7,341,365 B2
(45) Date of Patent: Mar. 11, 2008

(54) LED UNIT FOR A VEHICLE LAMP ASSEMBLY

(75) Inventors: Jim Basile, Dundee, MI (US); Mahendra Dassanayake, Bloomfield Hills, MI (US); Chad Clement, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 11/306,129

(22) Filed: Dec. 16, 2005

(65) Prior Publication Data

US 2007/0139946 A1 Jun. 21, 2007

(51) Int. Cl.
*F21W 101/02* (2006.01)
(52) U.S. Cl. ............. 362/511; 362/580; 362/547; 362/545
(58) Field of Classification Search ............ 362/511, 362/559, 507, 580, 547, 543, 544, 545
See application file for complete search history.

(56) References Cited

U.S. PATENT DOCUMENTS

| 4,654,761 | A | 3/1987 | Walsh |
| 5,816,681 | A | 10/1998 | Tedesco |
| 6,109,772 | A | 8/2000 | Futami et al. |
| 6,170,971 | B1* | 1/2001 | Godbillon ............ 362/543 |
| 6,367,950 | B1 | 4/2002 | Yamada et al. |
| 6,469,622 | B1 | 10/2002 | Komatsu et al. |
| 2004/0008516 | A1 | 1/2004 | Amano |
| 2004/0208016 | A1* | 10/2004 | Kazaoka et al. ........ 362/511 |
| 2004/0218400 | A1 | 11/2004 | Egashira |

* cited by examiner

*Primary Examiner*—Laura Tso
(74) *Attorney, Agent, or Firm*—Gigette M. Bejin; Dickinson Wright PLLC

(57) ABSTRACT

An LED unit for a vehicle lamp assembly. The LED unit is comprised of a housing, one or more LEDs, a light pipe, and an optic structure. The housing contains the LEDs and has the light pipe extending therefrom. The light pipe is sized sufficiently narrow for extending through a hole formed in a base portion of the vehicle lamp assembly. The light pipe is attached to an optic structure. The vehicle lamp assembly transmits light in a unilateral direction distal to the housing through the light pipe and the optic structure. The optic structure scatters light in a series of directions distal to the housing.

16 Claims, 3 Drawing Sheets

LED UNIT FOR A VEHICLE LAMP ASSEMBLY

TECHNICAL FIELD

The present invention relates generally to vehicles, and more particularly to an LED unit for a vehicle lamp assembly.

BACKGROUND

Automotive manufacturers are investigating light emitting diodes (LEDs) for vehicle lamp systems in view of LED efficiency, durability, long life, in addition to compact packaging and design opportunities associated therewith. LEDs are solid-state semiconductor devices that convert electrical energy directly into a predetermined color of light.

LEDs typically are efficient for consuming less power than conventional light sources, such as filament bulbs and neon lamps. For instance, a typical LED can consume as little as one Watt while a filament bulb can consume 25 Watts and a neon bulb can consume 116 Watts.

Furthermore, LEDs typically offer significant resistance to shock and vibration and may thus provide more than 10,000 hours of life. It is understood that these benefits can decrease the cost of warranties.

Moreover, LEDs have a mercury-free construction, which provides an environmentally responsible solution to lighting applications. LEDs can also decrease the glare perceived by oncoming drivers while maintaining a substantially high lumen output. LEDs can also provide whiter light than HID/Xenon sources, namely a Color Rendering Index (CRI) of 80 rather than a CRI of 65 provided by the HID/Xenon sources. For at least these reasons, LEDs can provide more consistent lighting than the other sources.

Existing LED systems have a series of LEDs packaged within an array, which is sized and shaped for a predetermined vehicle lamp. In this regard, the customized construction of the LED array cannot be universally installed within various vehicles, which typically have lamp assemblies with distinct shapes and sizes. Therefore, each array may be produced on a relatively small-scale basis and at significant costs.

On the other hand, it is understood that conventional filament bulbs are self-contained unitary light sources that can be readily installed within various lamp assemblies. For this reason, filament bulbs have been produced on a substantially large-scale basis and thus at generally low costs.

A typical vehicle lamp assembly comprises a light source, a reflective backing surface, and a cover. The reflective backing surface typically redirects light away from the vehicle and through the cover in a predetermined direction and/or scatter pattern. To the extent that the cover is clear, the reflective surface is visible from the exterior of the vehicle. In this way, the reflective surface can somewhat limit the variation in lamp assembly designs.

It would therefore be desirable to provide an LED unit for a lamp assembly that enhances vehicle design and can also be universally installed within a variety of vehicle lamp assemblies.

SUMMARY OF THE INVENTION

An LED unit for a vehicle lamp assembly is provided. The LED unit is comprised of a housing, one or more LEDs, a light pipe, and an optic structure. The housing contains the LEDs and has the light pipe extending therefrom. The light pipe is sized sufficiently narrow for extending through a hole formed in a base portion of the lamp assembly. The light pipe is attached to an optic structure. The LEDs transmit light through the light pipe and the optic structure in a unilateral direction distal to the housing. The optic structure scatters light in a plurality of directions distal to the housing.

One advantage of the invention is that an LED unit for a vehicle lamp assembly is provided that has a standardized construction for use in a variety of vehicle lamp assemblies and thus provides economy of scale.

Another advantage of the invention is that an LED unit for a vehicle lamp assembly is provided that is readily repaired and/or replaced at substantially low costs.

Yet another advantage of the invention is that an LED unit for a vehicle lamp assembly is provided that enhances vehicle styling and brand recognition.

Still another advantage of the invention is that an LED unit for a vehicle lamp assembly is provided that consumes substantially small amounts of energy.

Yet another advantage of the invention is that an LED unit for a vehicle lamp assembly is provided that is efficiently packaged for increasing available space for the engine compartment, cargo storage, passenger cabin, and other vehicle structures.

Still another advantage of the invention is that an LED unit for a vehicle lamp assembly is provided that maintains a substantially high lumen output over a significant period of time.

Yet another advantage of one embodiment of the claimed invention is that an LED unit for a vehicle distance sensing system for is provided that detects the distance of nearby objects and enhances the vehicle design.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figure 1:
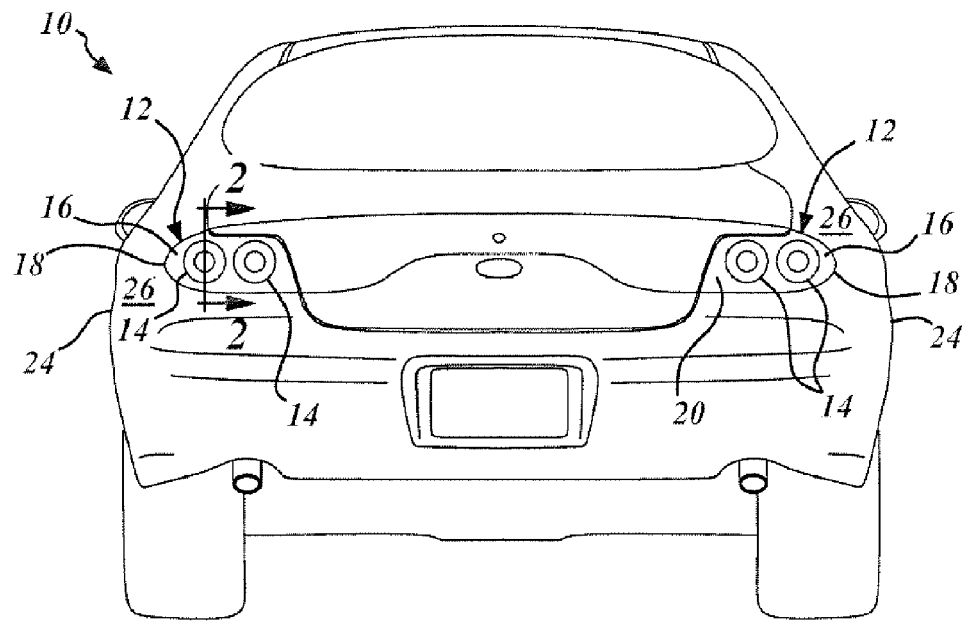
FIG. 1 is a rear plan view of a vehicle having two (2) lamp assemblies with four (4) light emitting diode (LED) units, according to one advantageous embodiment of the claimed invention.

In the following figures, the same reference numerals are used to identify the same components in the various views.

The present invention is particularly suited for an LED unit for an exterior rear vehicle lamp assembly. In this respect, the embodiments described herein employ structural features where the context permits. However, various other embodiments are contemplated having different combinations of the described features, having additional features other than those described herein, or even lacking one or more of those features. For instance, the LED unit can be integrated within an exterior front vehicle lamp assembly as desired.

Referring to FIG. 1, there is shown a rear plan view of a vehicle 10 having two (2) lamp assemblies 12, each with a pair of light emitting diode units 14 ("LED units").

Figure 2:
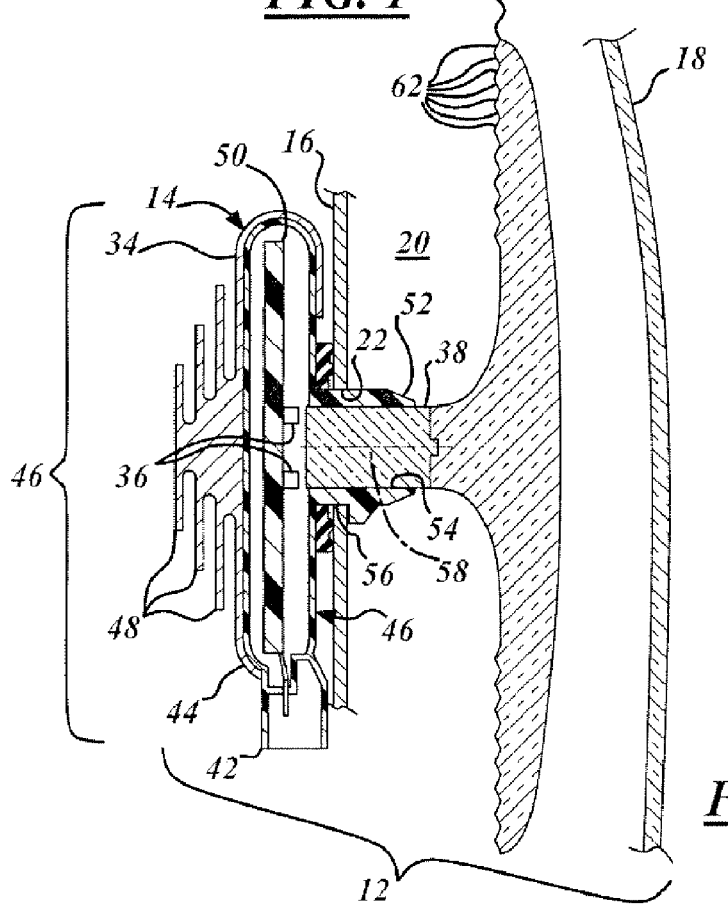
FIG. 2 is a cross-sectional view of the lamp assembly shown in FIG. 1, as taken along line 2-2.

With attention to FIG. 2, each lamp assembly 12 is comprised of a base portion 16, a clear lens cover 18, a lamp cavity 20 therebetween, and one or more LED units 14. Each LED unit 14 extends through a respective hole 22 in the base portion 16 and into the lamp cavity 20. As detailed below, the LED unit 14 is adapted for directing light in a unilateral direction from the base portion 16 through the clear lens cover 18. In this way, the lamp assembly 12 eliminates the need for a conventional reflective backing surface that redirects light away from the vehicle 10. Also, the base portion 16 and the lamp cavity 20 are visible through the clear lens cover 18 from an exterior of the vehicle 10. In addition, as detailed below, it will be appreciated that the lamp assembly 12 is beneficial for enhancing vehicle styling and brand recognition.

Figure 3:
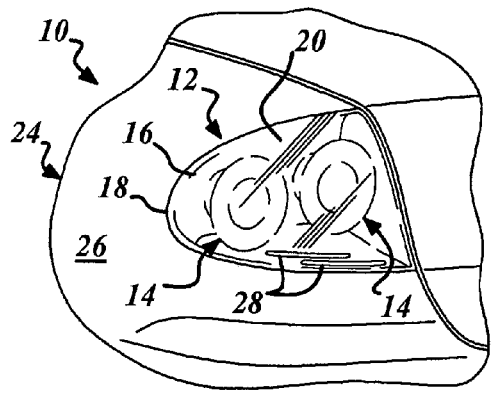
FIG. 3 is a perspective view of the lamp assembly shown in FIG. 1.

In the embodiment shown in FIG. 3, the base portion 16 is an integral part of a rear vehicle body panel 24, which further includes a peripheral panel portion 26 directly adjacent to the base portion 16. The base portion 16 and the peripheral panel portion 26 have an identical color for providing a streamlined or otherwise aesthetically pleasing vehicle design. Also, in this embodiment, the base portion 16 has a textured surface 28 and/or predetermined pattern for further enhancing the vehicle design.

However, it is contemplated that the base portion 16 can have a variety of other suitable surface textures, patterns, colors, or other suitable designs. For instance, the peripheral panel portion 26 can have a first predetermined color and the base portion 16 can have a second predetermined color. It will also be appreciated that the base portion 16 can instead be a separate component from the rear vehicle body panel 24 rather than being an integral part of the panel 24.

Figure 4:
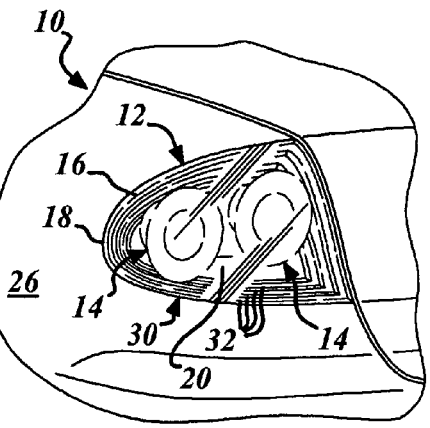
FIG. 4 is a perspective view of a lamp assembly, according to an alternative embodiment of the claimed invention.

Referring to the alternative embodiment shown in FIG. 4, the base portion 16 has a stepped construction 30 with a series of ledges 32 for emphasizing the depth and the outline of the lamp assembly 12.

It is contemplated that the lamp assembly 12, which eliminates the need for a reflective backing surface, provides a substantial number of lamp design configurations in addition to the embodiments exemplified in FIGS. 3 and 4.

Referring back to FIG. 2, the LED unit 14 is comprised of a housing 34, one or more light emitting diodes 36 (LEDs), a light pipe 38, and an optic structure 40, which can be clear, colored, translucent, transparent, or any suitable combination thereof. The LED unit 14 is a self-contained unitary light source, which is adapted for use in a variety of lamp assemblies 12 having various shapes and sizes. Accordingly, the LED unit 14 can likewise be easily replaced as needed without requiring the replacement of an entire LED array. In this way, the LED unit 14 provides an economy of scale that conventional LED arrays do not provide. In particular, as described above, conventional LED arrays typically are packaged for use only within predetermined lamp assemblies configured to receive those arrays.

In this embodiment, the housing 34 includes a plastic container 42 and a heat sink 44. The plastic container 42 has a flat disk construction 46 with the heat sink 44 extending directly therefrom. The heat sink 44 is comprised of metal and has a series of fins 48 for dissipating heat into the air by convective action.

The plastic container 42 contains a circuit board 50 with one or more LEDs 36. In this embodiment, the circuit board 50 has eight (8) LEDs 36, which all produce red light. However, the circuit board 50 can instead have more or less than eight (8) LEDs, which produce white light, colored light, or any combination thereof as desired.

The plastic container 42 further includes a socket portion 52, which has an internal surface 54 and an external surface 56. The internal surface 54 of the socket portion 52 is sized sufficiently small for receiving the light pipe 38 while the external surface 56 is sized for extending through the hole 22 in the base portion 16 and into the lamp cavity 20. The light pipe 38 is attached to an optic structure 40 within the lamp cavity 20. The light pipe 38 has a longitudinal axis 58 that extends through the clear lens cover 18. Also, as detailed below, the optic structure 40 is configured for scattering light through the clear lens cover 18. In this way, the lamp assembly 14 transmits light in a unilateral direction from the housing 34 then sequentially through the light pipe 38, the optic structure 40, and the clear lens cover 18. Also, the lamp assembly 14 directs the light along and/or parallel to the longitudinal axis 58.

Figure 5:
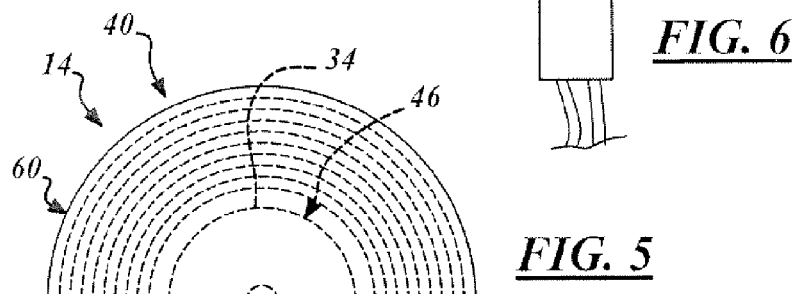
FIG. 5 is rear plan view of the LED unit shown in FIG. 2.

The optic structure 40 extends from the light pipe 38 and is shaped for scattering light in a predetermined pattern. For instance, in this embodiment, the optic structure 40 has a substantially round fiber optic construction 60 (as best shown in FIG. 5) with a series of angled ridges 62 (as best shown in FIG. 2) extending concentrically outward from the light pipe 38. In this way, the optic structure 40 scatters light in a series of concentric ring patterns.

Figure 6:
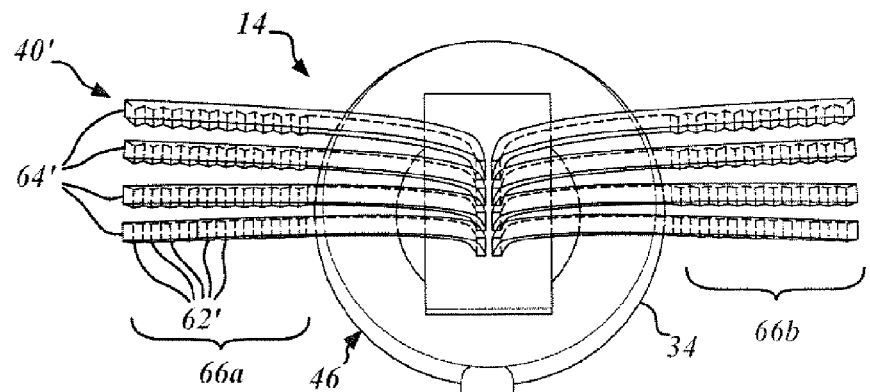
FIG. 6 is rear plan view of an LED unit according to an alternative embodiment of the claimed invention.

Referring to the alternative embodiment shown in FIG. 6, the optic structure 40' is comprised of a series of fiber optic arms 64' with a plurality of angled ridges 62' extending laterally outward from the light pipe 38. In that way, the optic structure 40' scatters light in two (2) stacks 66a, 66b of horizontal bar patterns.

It is contemplated that the optic structure 40 can have a variety of other suitable constructions or shapes for scattering light in various patterns as desired. Also, in this regard, it will be appreciated that the optic structure 40 dispenses with the need for an entire array of LEDs. Accordingly, the LED unit 14 has a substantially compact construction that can be utilized in various lamp assemblies.

Figure 7:
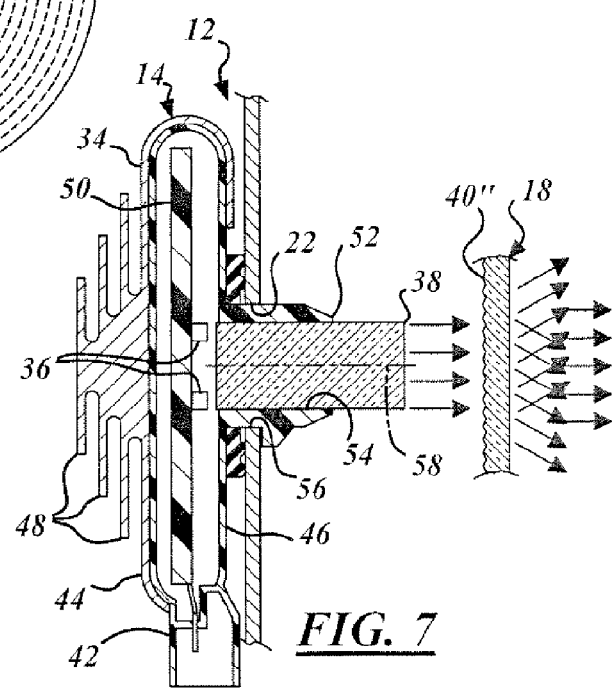
FIG. 7 is a cross-sectional view of the lamp assembly shown in FIG. 1, according to yet another alternative embodiment of the claimed invention.

Referring now to the embodiment shown in FIG. 7, it is contemplated that the optic structure 40" is an integral part of the clear lens cover 18 rather than an attachment to the light pipe 38.

Figure 8:
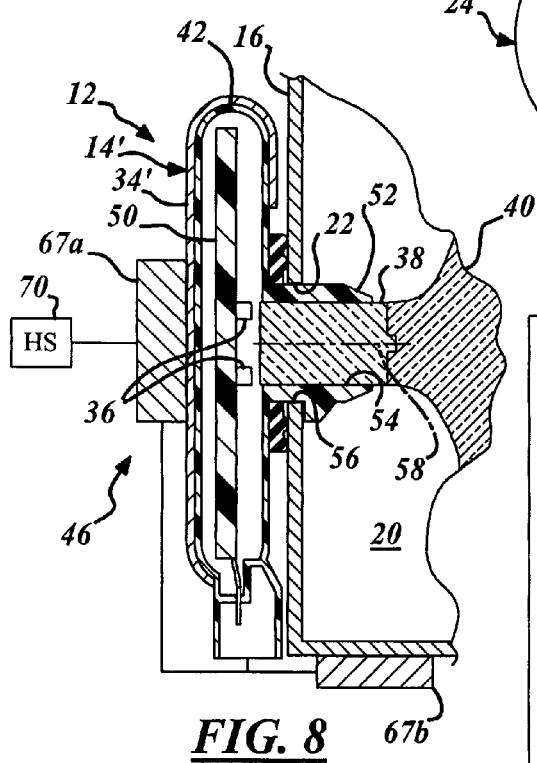
FIG. 8 is a cross-sectional view of a lamp assembly having an LED unit with a flat battery, according to still another alternative embodiment of the claimed invention.

With attention now to the embodiment shown in FIG. 8, the LED unit 14' is powered by one or more flat batteries 67a, 67b. In this embodiment, the heat sink 44 is omitted from the housing 34 so as to transfer heat to the flat battery 67a rather than dissipate the heat by convective action. One skilled in the art will understand that the flat batteries 67a, 67b recharge when they receive heat. A first flat battery 67a is attached directly to the housing 34' for the LED unit 14'. In this respect, the heat produced by the LED unit 14' is utilized for recharging the flat battery 67*a*. A second flat battery 67*b* is attached to the base portion 16 for the lamp assembly 12. However, it will be appreciated that the battery 67*b* can instead be attached to other suitable exterior vehicle body structures receiving ambient heat, e.g. solar radiation.

Also, in this embodiment, the first flat battery 66*a* is attached to a vehicle braking mechanism 70 for receiving additional heat therefrom and regenerating its power supply. It is contemplated that the LED unit 14 can receive power from more or less than two flat batteries 67*a*, 67*b*, which receive heat from any combination of suitable heat sources.

Figure 9:
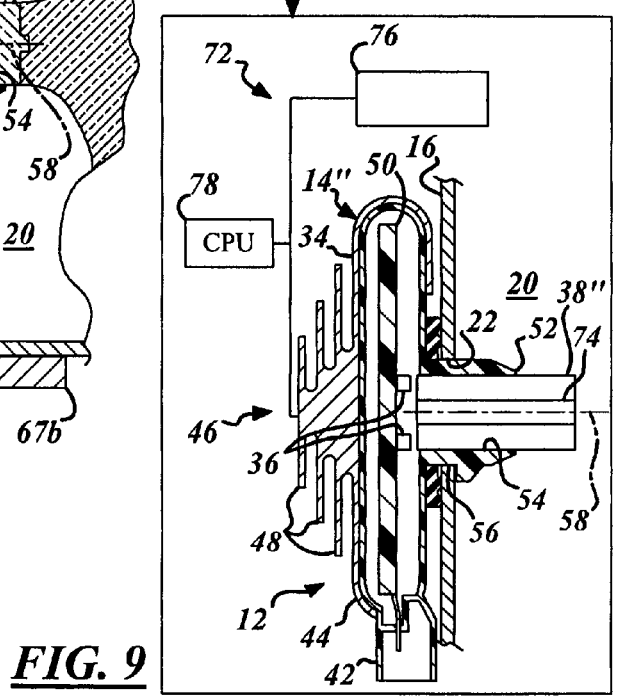
FIG. 9 is a schematic view of a reverse sensing mechanism for a vehicle having a lamp assembly, according to yet another alternative embodiment of the claimed invention.

Referring now to the embodiment shown in FIG. 9, there is a shown a distance sensing system 72 for a vehicle having an LED unit 14" according to yet another alternative embodiment of the invention. In this embodiment, the system 72 includes a transmitter 74, a receiver 76, and a controller 78. The transmitter 74 is integrated within the light pipe 38" of the LED unit 14" while the receiver 76 is integrated within another suitable portion of the vehicle 10. For instance, the receiver 76 can be integrated within the light pipe of another LED unit.

In operation, the transmitter 74 emits a signal to a nearby object, which redirects the signal to the receiver 76. The controller 78 then processes the signal to determine the distance between the vehicle and the object.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A vehicle lamp assembly comprising:
   a base portion attached to a vehicle, wherein said base portion is an integral part of a uniformly colored vehicle body panel;
   a clear lens cover covering said base portion;
   a lamp cavity between said base portion and said clear lens cover; and
   an LED unit extending through a hole in said base portion and into said lamp cavity;
   said vehicle lamp assembly directing light in a unilateral direction from said LED unit through said clear lens cover;
   said base portion and said lamp cavity visible through said clear lens cover.

2. The vehicle lamp assembly recited in claim 1 wherein said base portion has at least one of a textured surface and a stepped construction visible through said clear lens cover.

3. The vehicle lamp assembly recited in claim 1 wherein said base portion has a first predetermined color and is an integral part of a vehicle body panel, said vehicle body panel further comprising a peripheral portion that is adjacent to said base portion and has a second predetermined color.

4. The vehicle lamp assembly recited in claim 1 wherein said base portion defines a plurality of said holes sized for extending a plurality of said LED units therethrough.

5. The vehicle lamp assembly recited in claim 1 wherein said LED unit comprises:
   a housing;
   at least one light emitting diode in said housing;
   a light pipe extending from said housing and sized sufficiently narrow for extending trough said hole in said base portion; and
   an optic structure attached to said light pipe;
   said optic structure receiving light from said at least one light-emitting diode and scattering light through said clear lens cover.

6. The vehicle lamp assembly recited in claim 5 wherein said optic structure comprises a plurality of arm members arranged in a predetermined configuration.

7. The vehicle lamp assembly recited in claim 5 wherein said optic structure has a substantially round construction.

8. The vehicle lamp assembly recited in claim 5 wherein said light pipe has a longitudinal axis extending through said clear lens cover and directs light along said longitudinal axis.

9. The vehicle lamp assembly recited in claim 5 further comprising:
   a circuit board with said at least one light emitting diode attached thereto;
   said circuit board contained within said housing;
   said housing comprised of a plastic container and a heat sink;
   said plastic container having a substantially flat disk construction with said circuit board therein;
   said heat sink attached to said container and having a plurality of fins.

10. The vehicle lamp assembly recited in claim 9 wherein said plastic container has a socket portion receiving said light pipe and an external surface extending through said hole in said base portion.

11. The vehicle lamp assembly recited in claim 1 wherein said clear lens cover has an optic structure for scattering light.

12. A vehicle lamp assembly comprising:
    a base portion attached to a vehicle;
    a clear lens cover covering said base portion and defining a lamp cavity therebetween; and
    at least one LED unit attached to said base portion;
    said vehicle lamp assembly directing light in a unilateral direction from said at least one LED) unit through said clear lens cover;
    said base portion and said lamp cavity visible through said clear lens cover;
    said LED unit powered by a flat battery for conserving energy within said vehicle;
    wherein said flat battery is attached to at least one of a vehicle braking mechanism, said LED unit, and a predetermined heat source within said vehicle for receiving heat therefrom.

13. A vehicle lamp and distance sensing system, comprising:
    a lamp assembly, comprising:
    a base portion attached to a vehicle;
    a clear lens cover covering said base portion;
    a lamp cavity between said base portion and said clear lens cover;
    an LED unit extending through a hole in said base portion and into said lamp cavity;
    said vehicle lamp assembly directing light in a unilateral direction from said LED unit trough said clear lens cover;
    said base portion and said lamp cavity visible through said clear lens cover; and
    a distance sensing system, comprising:
    a transmitter emitting a signal from said vehicle;
    a receiver receiving said signal reflected back to said vehicle; and
    a controller coupled to said transmitter and said receiver for processing said signal and for determining a clearance for said vehicle, with said at least one of said transmitter and said receiver comprising an integral part of said vehicle lamp assembly.

14. The distance sensing system recited in claim 13, wherein said LED unit is comprised of:
 a housing;
 at least one light emitting diode in said housing;
 a light pipe extending from said housing through said hole in said base portion and into said lamp cavity;
 said light pipe directing light from said at least one light emitting diode into said lamp cavity; and
 at least one of said transmitter and said receiver within said light pipe.

15. An LED unit for a vehicle lamp assembly, comprising:
 a housing;
 at least one light emitting diode in said housing;
 a light pipe extending from said housing and sized sufficiently narrow for extending through a hole formed in a base portion of said vehicle lamp assembly;
 an optic structure attached to said light pipe;
 said optic structure receiving light from said at least one light-emitting diode and scattering light in a plurality of directions unilaterally distal to said housing.

16. The LED unit recited in claim 14 wherein said housing defines a socket with said light pipe therein and said socket sized sufficiently small for extending through said hole in said base portion.

\* \* \* \* \*

UNITED STATES PATENT AND TRADEMARK OFFICE
CERTIFICATE OF CORRECTION

PATENT NO. : 7,341,365 B2 Page 1 of 1
APPLICATION NO. : 11/306129
DATED : March 11, 2008
INVENTOR(S) : Jim Basile, Mahendra Dassanayake and Chad Clement It is certified that error appears in the above-identified patent and that said Letters Patent is hereby corrected as shown below:

Title page, item [75]
Inventorship:

should be:

Jim Basile
Mahendra Dassanayake
Chad Clement
Thomas Tessnow

Claim 5, Column 5, Line 65, should read as follows: -- ficiently narrow for extending through said hole in said --

Claim 13, Column 6, Line 37, should read as follows: -- direction from said at least one LED unit through said --

Claim 16, Column 8, Line 10, should read as follows: -- 16. The LED unit recited in claim 15 wherein said housing --

Signed and Sealed this

Seventh Day of July, 2009

JOHN DOLL
*Acting Director of the United States Patent and Trademark Office*